United States Patent
Hanada

(10) Patent No.: US 9,019,176 B2
(45) Date of Patent: Apr. 28, 2015

(54) IMAGE FORMING APPARATUS

(75) Inventor: Yoshihiro Hanada, Kanagawa (JP)

(73) Assignee: Pioneer Corporation, Kanagawa (JP)

( * ) Notice: Subject to any disclaimer, the term of this patent is extended or adjusted under 35 U.S.C. 154(b) by 297 days.

(21) Appl. No.: 13/811,408

(22) PCT Filed: Jul. 22, 2010

(86) PCT No.: PCT/JP2010/062363
§ 371 (c)(1),
(2), (4) Date: Jan. 22, 2013

(87) PCT Pub. No.: WO2012/011183
PCT Pub. Date: Jan. 26, 2012

(65) Prior Publication Data
US 2013/0120225 A1 May 16, 2013

(51) Int. Cl.
*G09G 1/08* (2006.01)
*G09G 1/10* (2006.01)
*H04N 3/08* (2006.01)
*H04N 3/30* (2006.01)
*G09G 3/34* (2006.01)
*G09G 3/02* (2006.01)
*G09G 5/10* (2006.01)

(52) U.S. Cl.
CPC .. *G09G 1/10* (2013.01); *H04N 3/08* (2013.01); *H04N 3/30* (2013.01); *G09G 3/346* (2013.01); *G09G 3/025* (2013.01); *G09G 5/10* (2013.01); *G09G 2310/02* (2013.01); *G09G 2310/0283* (2013.01); *G09G 2320/041* (2013.01)

(58) Field of Classification Search
None
See application file for complete search history.

(56) References Cited

U.S. PATENT DOCUMENTS

| 7,580,007 | B2 | 8/2009 | Brown et al. |
| 8,068,115 | B2 | 11/2011 | Brown et al. |
| 8,274,522 | B2 | 9/2012 | Brown et al. |
| 2004/0004585 | A1 | 1/2004 | Brown et al. |
| 2006/0164330 | A1 * | 7/2006 | Bright et al. ............ 345/7 |
| 2007/0291051 | A1 | 12/2007 | Brown et al. |
| 2008/0144150 | A1 | 6/2008 | Champion et al. |

(Continued)

FOREIGN PATENT DOCUMENTS

| JP | 61-112120 | 5/1986 |
| JP | 11-146222 | 5/1999 |

(Continued)

OTHER PUBLICATIONS

International Search Report, PCT/JP2010/062363, Sep. 21, 2010.

*Primary Examiner* — Christopher R Lamb
(74) *Attorney, Agent, or Firm* — Young & Thompson

(57) ABSTRACT

An image forming apparatus that displays an image, includes: a scanning section that scans light from a light source in a main scanning direction and a sub-scanning direction orthogonal to the main scanning direction, as drawing sine waves; a detecting part that detects a change in a position of the scanning part in the main scanning direction and a change in a position of the scanning part in the sub-scanning direction; a phase difference comparator that detects a phase difference and a frequency ratio between the main scanning direction and the sub-scanning direction, based on the change in the position of the main scanning direction and the change in the position of the sub-scanning direction; and an image data generation part that estimates a scanning trajectory of the scanning part based on the phase difference and the frequency ratio, and generates pixel data corresponding to the scanning trajectory.

3 Claims, 6 Drawing Sheets

(56) References Cited

U.S. PATENT DOCUMENTS

| | | |
|---|---|---|
| 2009/0091666 A1 | 4/2009 | Kurozuka et al. |
| 2009/0213040 A1 | 8/2009 | Brown et al. |
| 2009/0316243 A1* | 12/2009 | Tsuida .................. 359/202.1 |
| 2010/0002152 A1* | 1/2010 | Nishioka et al. ............ 348/744 |
| 2010/0033691 A1* | 2/2010 | Hung et al. ................. 353/70 |
| 2011/0069084 A1 | 3/2011 | Brown et al. |
| 2011/0122101 A1* | 5/2011 | Kurozuka ................. 345/204 |

FOREIGN PATENT DOCUMENTS

| | | |
|---|---|---|
| JP | 2003-295102 | 10/2003 |
| JP | 2005-526289 | 9/2005 |
| JP | 2008-216299 | 9/2008 |
| JP | 2010-164954 | 7/2010 |
| JP | 2010-197930 | 9/2010 |
| WO | WO 2006/082827 | 8/2006 |
| WO | WO 2007/105678 | 9/2007 |

\* cited by examiner

IMAGE FORMING APPARATUS

CROSS-REFERENCES TO RELATED APPLICATIONS

This application claims the benefit of PCT International Patent Application No. PCT/JP/2010/062363 filed Jul. 22, 2010, which is incorporated herein by reference.

BACKGROUND

1. Field of the Invention

The present invention relates to a scanning type image forming apparatus.

2. Description of the Related Art

Conventionally, an image forming apparatus has been known, which has a MEMS (Micro Electro Mechanical System) mirror operating at a high speed while irradiated with laser light. In order to perform drawing with this image forming apparatus, a MEMS mirror may be resonantly driven to scan in the vertical direction and the horizontal direction at respective resonance frequencies, as drawing Lissajous figures (hereinafter "Lissajous scanning"). In this case, drawing points can be separated into a vertical scanning line Y representing a vertical component and a horizontal scanning line X representing a horizontal component. The vertical scanning line Y is represented by the following equation 1, where the angular frequency in vertical direction (resonance frequency) is ωy and time is t. Meanwhile, the horizontal scanning line X is represented by the following equation 2, where the angular frequency in vertical direction (resonance frequency) is ωx and time is t.

$$Y = \sin \omega y t \quad \text{(Equation 1)}$$

$$X = \sin(\omega x t + \phi) \quad \text{(Equation 2)}$$

Here, φ represents the phase difference with respect to vertical scanning line Y. When there is no phase difference φ (φ=0), a drawing trajectory (scanning trajectory) in which outward journey (solid line) Ta and return journey (dashed line) Tb is evenly arranged, as shown in FIG. 6A. Here, FIG. 6A shows an exemplary Lissajous scanning to perform drawing for one frame within a period of time for a round trip (one cycle) in the vertical direction.

However, because the resonance frequencies of a MEMS mirror are changed due to a condition such as temperature, there is a problem that the phase difference φ between the vertical scanning line X and the horizontal scanning line Y changes to narrow the distance between the outward journey Ta (solid line) and the return journey Tb (dashed line) of the drawing trajectory, so that the density of the drawing trajectory may be changed (that is, the drawing trajectory is not even) depending on the drawing points.

To address the problem, a configuration as disclosed, for example, in Patent Literature 1 has been considered where a scanning line detecting means and a control means are provided. The scanning line detecting means can detect the distance between at least two adjacent scanning lines in the sub-scanning direction (vertical direction) and in the main scanning direction (horizontal direction). The control means controls the phase of the deflection angle of a deflector (MEMS mirror) such that the distance between the at least two adjacent scanning lines detected by the scanning line detecting means is fixed in the sub-scanning direction and the directions of the two scanning lines are opposite to one another in the main scanning direction.

Patent Literature 1: Japanese Patent Application Laid-Open No. 2008-216299 (claim 5 and paragraph 0021)

With this configuration, it is possible to ensure that the distance between adjacent scanning lines is fixed and Lissajous scanning is controlled precisely, and therefore improve the quality of an image formed on a scanning surface. Here, in order to realize a deflector such as a MEMS mirror with high operationality and low power consumption, it is necessary to drive the deflector at the resonance frequencies (natural frequencies). However, with the configuration disclosed in Patent literature 1, the respective driving frequencies of the deflector in the main scanning direction and the sub-scanning direction are controlled to vary from the proper resonance frequencies, and therefore the power consumption required to drive the deflector is likely to increase. Moreover, when the drive frequencies are significantly different from the resonance frequencies, the driving amplitude (deflection angle) of a deflector may decrease, and, if so, drive control itself is likely to be difficult.

SUMMARY

The present invention was made in view of the above described problems, it is therefore an object of the present invention to provide an image forming apparatus that can solve the problems.

To solve the above-described problems, the image forming apparatus according to claim 1 includes: a scanning section configured to scan light from a light source in a main scanning direction and a sub-scanning direction orthogonal to the main scanning direction as drawing sine waves at predetermined resonance frequencies, respectively; a drive control part configured to track a change in the resonance frequencies to perform drive control of the scanning part according to changed resonance frequencies; a detecting part configured to detect a change in a position of the scanning part in the main scanning direction and a change in a position of the scanning part in the sub-scanning direction; a phase difference comparator configured to detect a phase difference and a frequency ratio between the main scanning direction and the sub-scanning direction, based on the change in the position of the main scanning direction and the change in the position of the sub-scanning direction, which are detected by the detecting part; and an image data generation part configured to estimate a scanning trajectory of the scanning part based on the phase difference and the frequency ratio detected by the phase comparator, and generate pixel data corresponding to the scanning trajectory. The scanning part scans one frame within a period of time for which scanning in the sub-scanning direction is performed in one direction.

DETAILED DESCRIPTION

Figure 1:
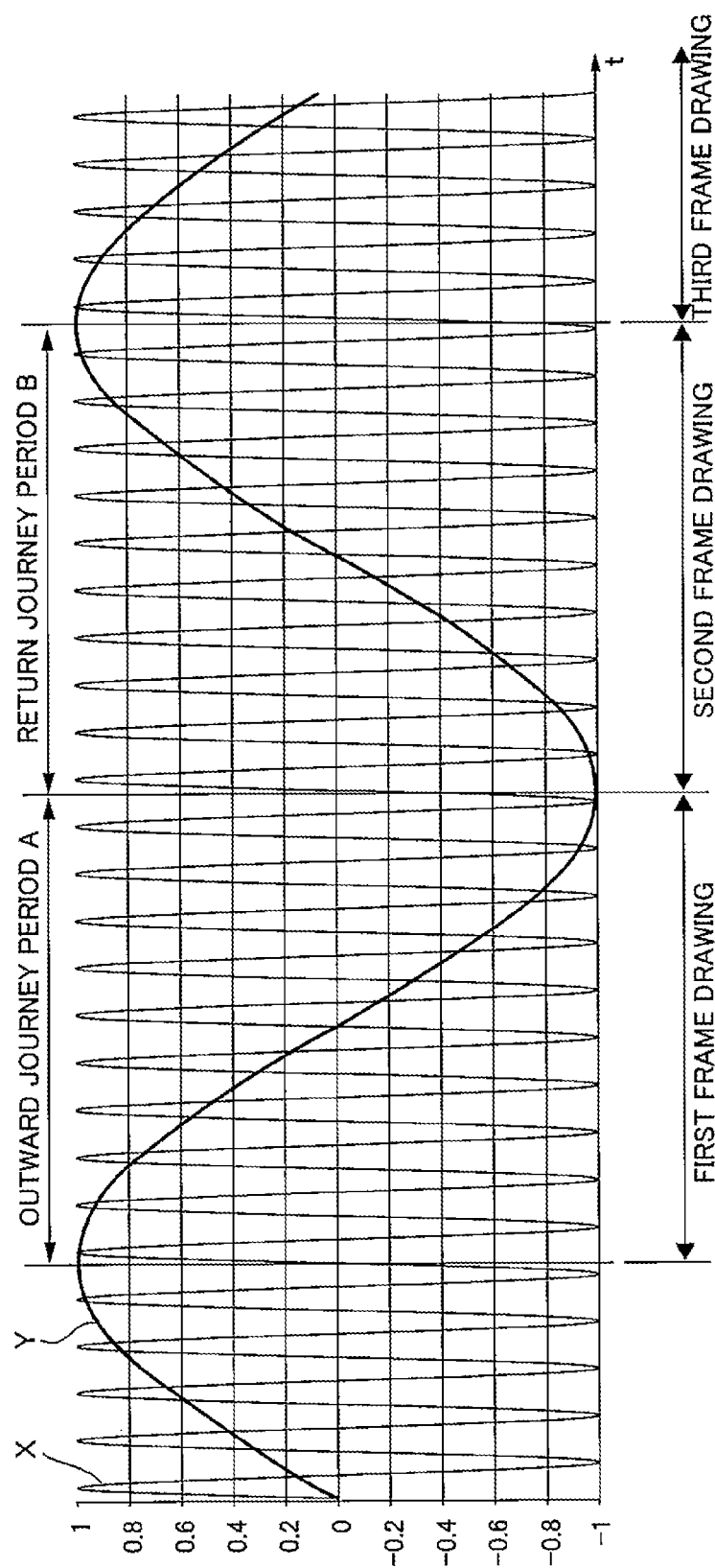
FIG. 1 is a conceptual diagram showing the scanning and drawing by an image forming apparatus according to one embodiment of the present invention.

Now, an embodiment of the present invention will be described in detail with reference to the drawings. For the sake of convenience, components having the same operational effect are assigned the same reference numerals, and overlapping descriptions will be omitted. The present invention is broadly applicable to image forming apparatuses having a scanning part that performs scanning in the main scanning direction and the sub-scanning direction as drawing sine waves. Here, a case will be described as an example where the present invention is applied to an image forming apparatus including a MEMS mirror resonantly driven in the main scanning direction and the sub-scanning direction at respective resonance frequencies.

FIG. 1 is a conceptual diagram showing scanning according to the present embodiment. A horizontal scanning line X (consisting of points scanned in the horizontal direction) and a vertical scanning line Y (consisting of points scanned in the vertical direction) are drawn, where the horizontal axis represents time and the vertical axis represents amplitude. With the present embodiment, scanning is performed for one frame within the period of time for which vertical scanning is performed in one direction. That is, the horizontal scanning line X for one frame is drawn for each of the period of time for which the amplitude of the vertical scanning line Y becomes from 1 to −1 (outward journey A) and the period of time for which the amplitude of the vertical scanning line Y becomes from −1 to 1 (return journey B), and this operation is repeated. This prevents the density of the drawing trajectory for one frame from varying and also prevents the variation in the brightness of an image.

With the above-described configuration, the resonance frequency for horizontal drawing and the resonance frequency for vertical drawing are set as the following equation 3, where resonance frequency $\omega y$ is set to a value of the half of the frame rate.

Resonance frequency $\omega y$: resonance frequency $\omega x=1$:
the number of horizontal scanning lines       (Equation 3)

Now, further explanations will be given using an example in which the number of horizontal scanning lines is twenty and a frame rate is 60 fps. Here, with this example, the resonance frequency $\omega y$ is 30 Hz and the resonance frequency $\omega x$ is 600 Hz according to equation 3.

Figure 2:
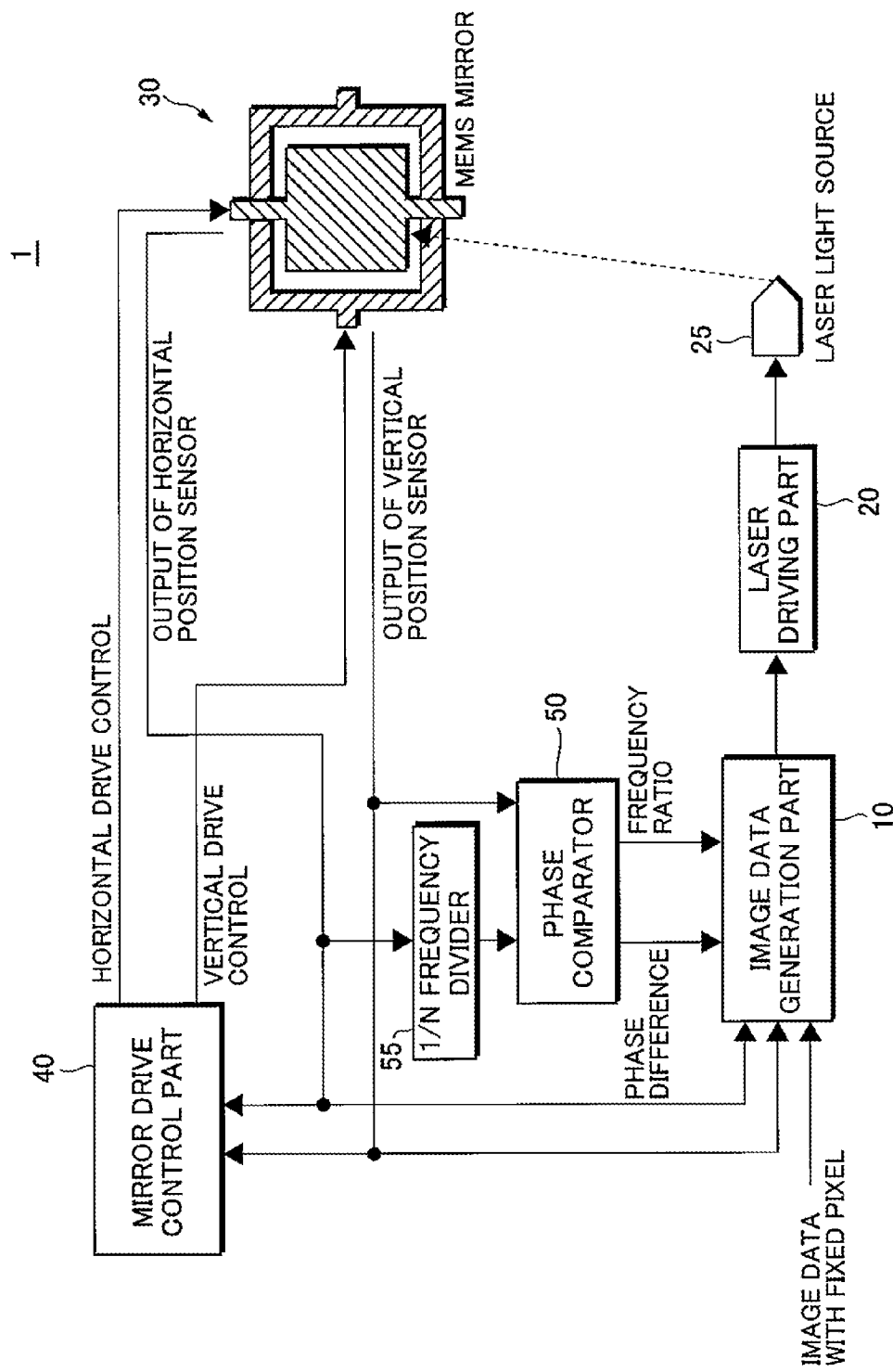
FIG. 2 is a block diagram showing the configuration of the image forming apparatus according to one embodiment of the present invention.

FIG. 2 is a block diagram showing an image forming apparatus 1 according to the present embodiment. In the image forming apparatus 1, pixel data generated by a pixel data generation part 10 is inputted to a laser driving part 20, and a MEMS mirror 30, which serves as a scanning part, is irradiated with the laser light from a laser light source 25 such as an LD (laser diode), which is driven by the laser light source 20. A mirror drive control part 40 controls the MEMS mirror 30 to resonantly drive in the horizontal direction that is the main scanning direction, and the vertical direction that is the sub-scanning direction orthogonal to the horizontal direction as drawing sine waves at the resonance frequencies, respectively. Here, the image forming apparatus 1 is provided with a horizontal position sensor (not shown) that detects the position of the MEMS mirror 30 in the horizontal direction, and a vertical position sensor (not shown) that detects the position of the MEMS mirror 30 in the vertical direction. Output from these position sensors are fed back to the mirror drive control part 40.

The mirror drive control part 40 stores the respective resonance frequencies of the MEMS mirror 30 in the normal condition in the horizontal direction and the vertical direction (the resonance frequency $\omega y$ is 30 Hz and the resonance frequency $\omega x$ is 600 Hz). In the normal condition, the mirror drive control part 40 outputs sine wave drive signals with the respective resonance frequencies to the MEMS mirror 30 to resonantly drive the MEMS mirror 30 at the respective resonance frequencies. Then, in order to output the drive signals having the frequencies that allow the MEMS mirror 30 always to be deflected at the maximum angle, the mirror drive control part 40 monitors the deflection angle of the MEMS mirror 30 with the horizontal position sensor and the vertical position sensor when the frequency of each of the drive signals outputted to the MEMS mirror 30 is slightly changed. By this means, when the resonance frequencies are changed due to the change in conditions such as temperature, the MEMS mirror 30 is consistently driven at the changed resonance frequencies correspondingly, so that it is possible to reduce the power consumption while increasing the deflection angle.

The respective outputs of the vertical sensor and the horizontal sensor which are provided in the MEMS mirror 30 are inputted to a phase comparator 50. Here, in the illustration, the output of the horizontal position sensor is inputted to the phase comparator 50 after passing through a 1/N frequency divider 55, where "N" of this 1/N frequency divider 55 is set to "20" that is the number of horizontal scanning lines. The phase comparator 50 calculates a phase difference $\phi$ and a frequency ratio R between the vertical scanning line Y and the horizontal scanning line X, based on the output of the vertical position sensor, which has been received, and the output of the horizontal position sensor, which has passed through the 1/N frequency divider 55, and outputs the result to the pixel data generation part 10. Here, the frequency ratio R is calculated as the following equation 4, which is proportional to (resonance frequency $\omega x$)/(resonance frequency $\omega y$).

Frequency ratio $R$=(the output of the horizontal position sensor having passed through the 1/N frequency divider)/(the output of the vertical position sensor)      (Equation 4)

Here, in the normal condition, phase difference $\phi$ is 0, and frequency ratio R is 1, which are the reference values.

Figure 3:
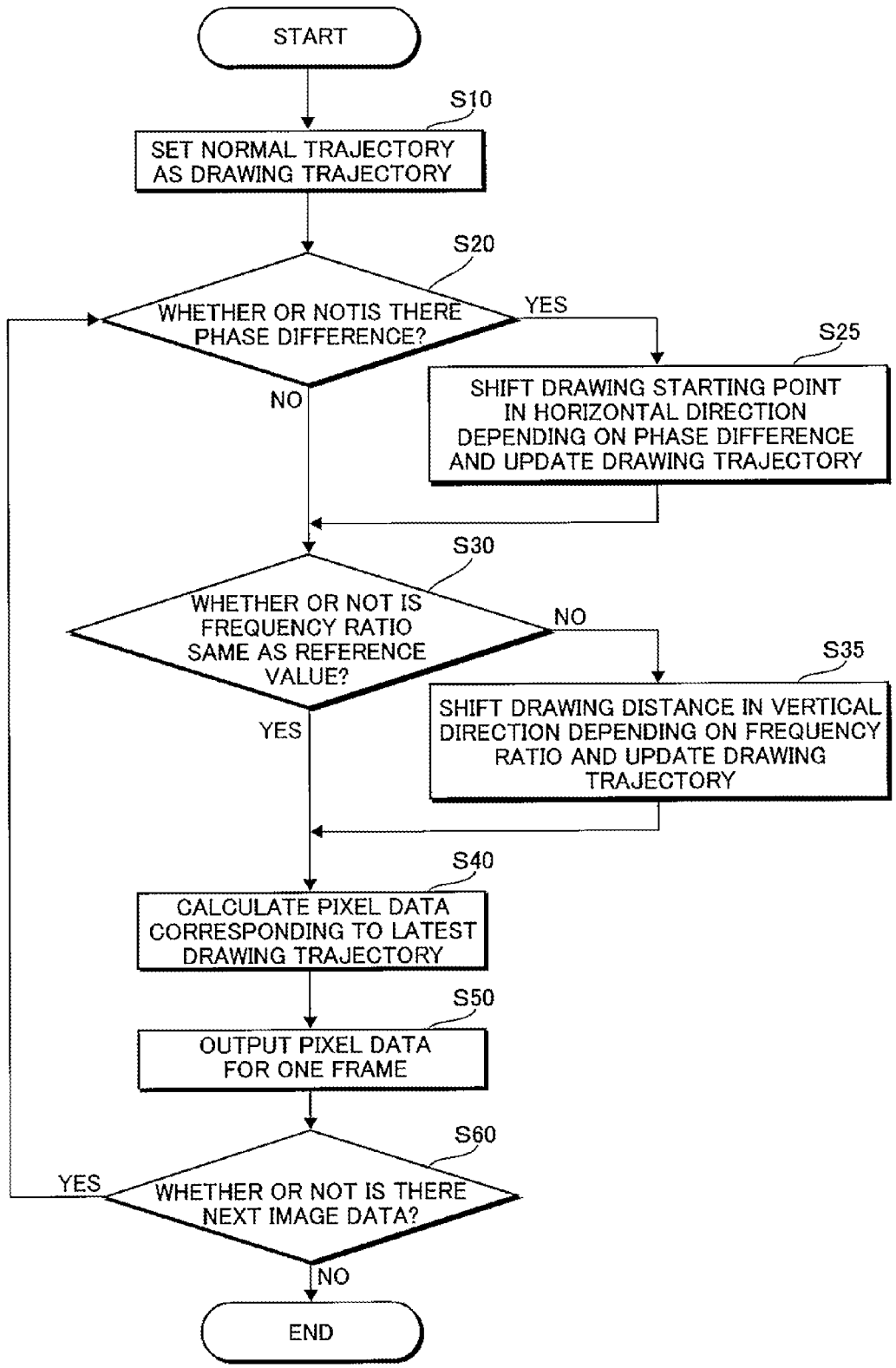
FIG. 3 is a flowchart showing the control of a pixel data generation part in the image forming apparatus according to one embodiment of the present invention.

The pixel generation part 10 receives, as input, image data with the fixed pixels, the output of the vertical position sensor and the output of the horizontal position sensor, as well as the phase difference $\phi$ and the frequency ratio R, and generates pixel data to be outputted to the laser driving part 20. Now, generation of pixel data by the pixel data generation part 10 will be described with reference to FIG. 3 to FIG. 5, using an example where the normal condition (the resonance frequency $\omega y$=30 Hz, the resonance frequency $\omega x$=600 Hz and the phase difference $\phi$=0) is set as default.

Figure 4:
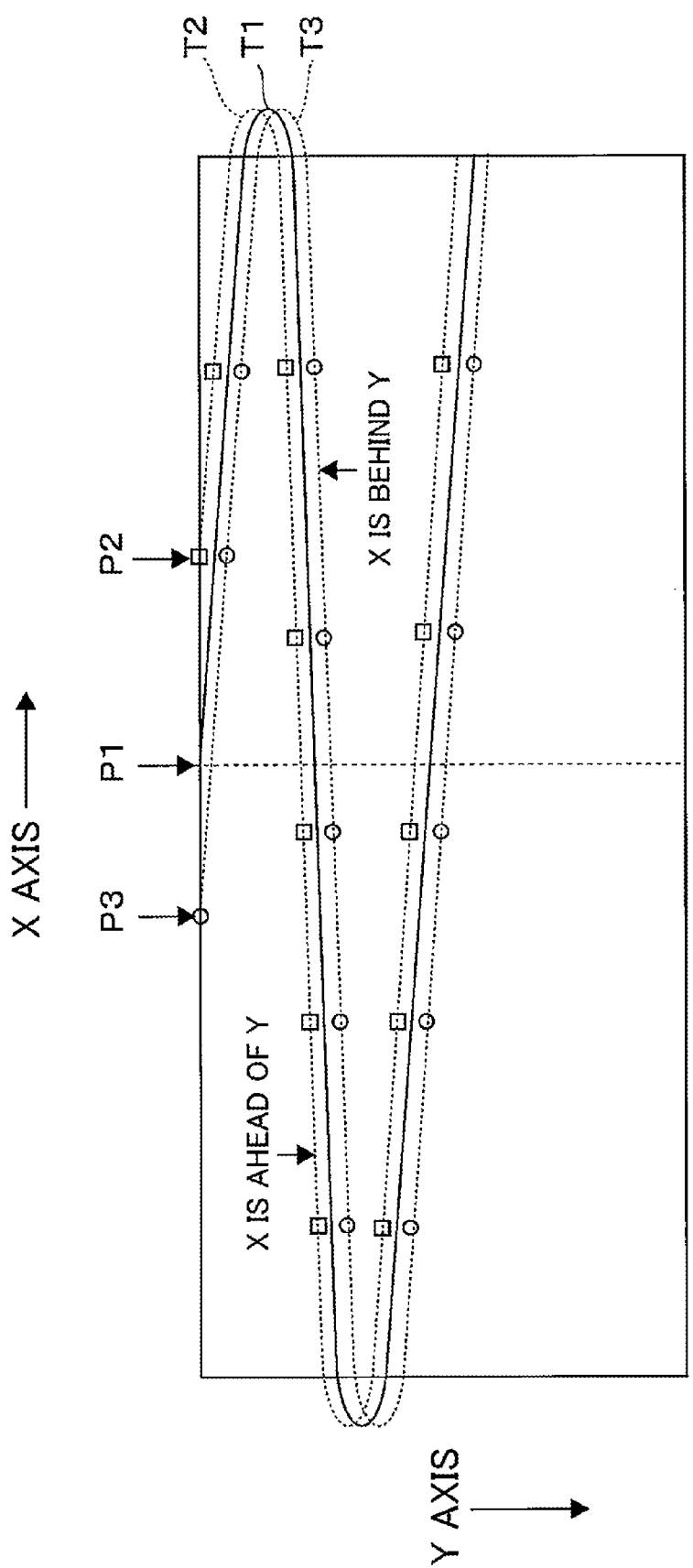
FIG. 4 is a schematic diagram showing a drawing trajectory predicted by the pixel data generation part.
Figure 5:
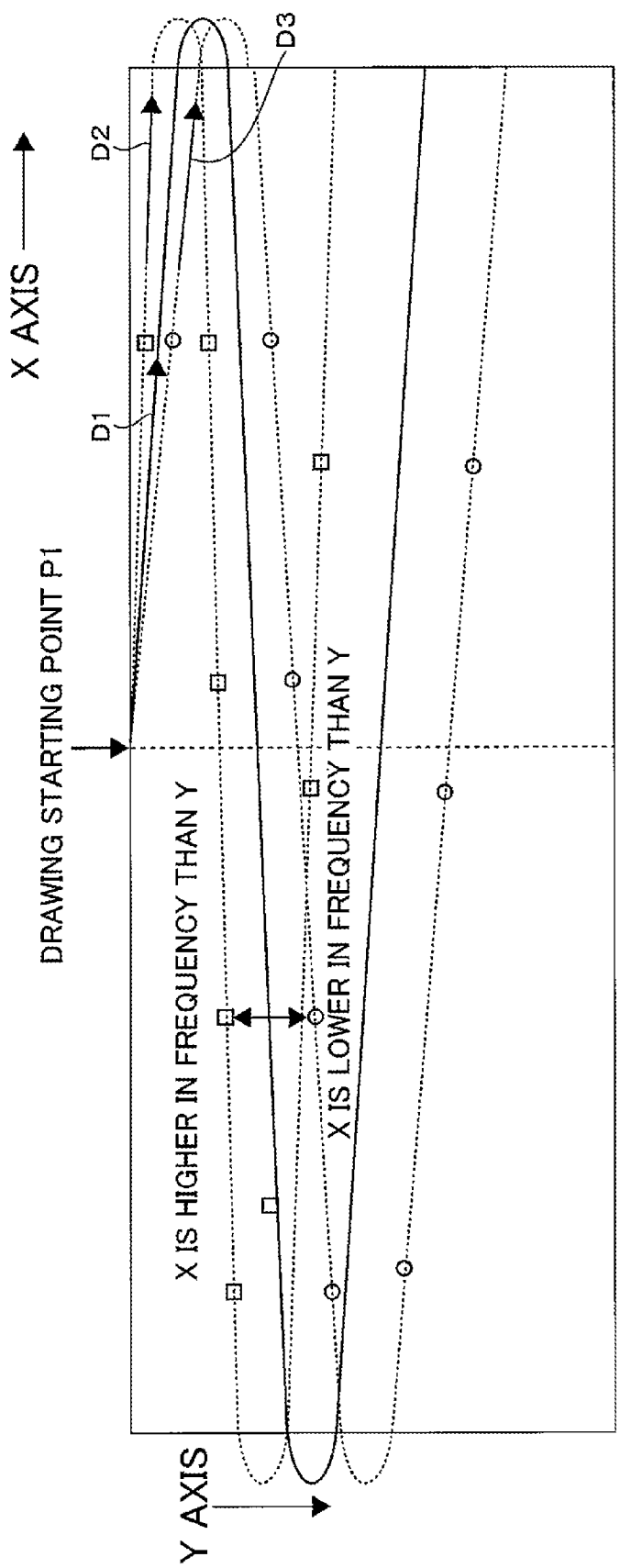
FIG. 5 is a schematic diagram showing a drawing trajectory predicted by the pixel data generation part.
Figure 6:
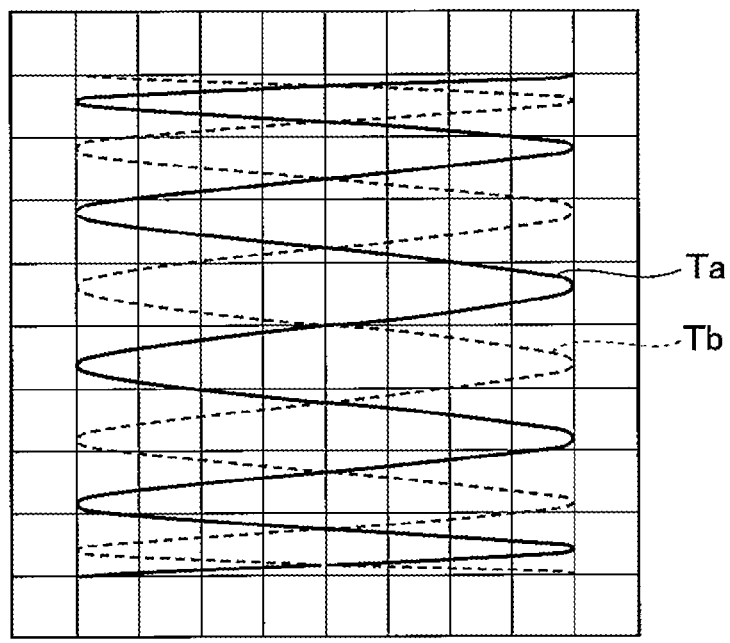
FIG. 6A is a schematic diagram showing exemplary Lissajous scanning.
FIG. 6B is a schematic diagram showing exemplary Lissajous scanning.
Figure 6:
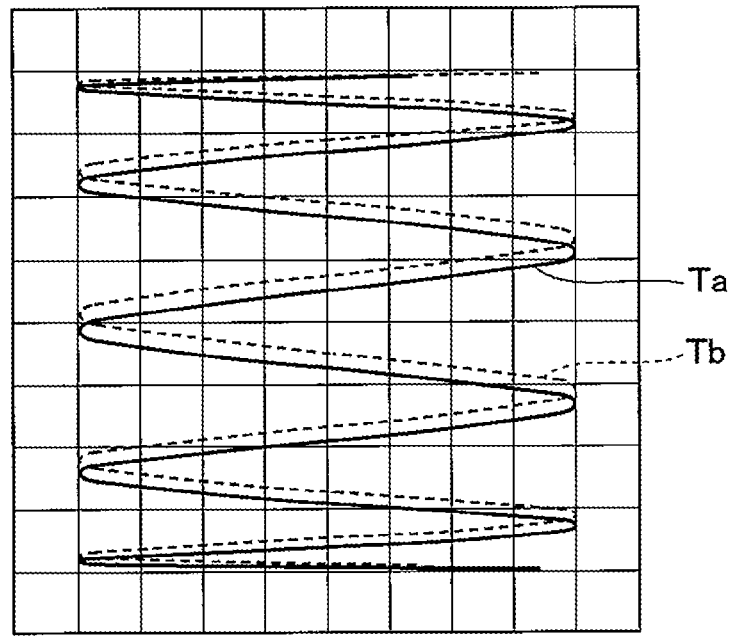

First, the control of the pixel generation part 10 is stared while the mirror drive control part 40 controls the MEMS mirror 30 in default configuration as the normal condition. In this case, the drawing trajectory of the MEMS mirror 30 is shown in FIG. 4 as T1, where, for example, starting from the upper center of the display screen as the starting point (drawing starting point P1), the drawing trajectory is formed according to X=sin $\omega xt$, Y=sin $\omega yt$ (hereinafter, this drawing trajectory of the MEMS mirror 30 in the normal condition is referred to as "normal trajectory"). Then, the pixel data generation part 10 initially sets the normal trajectory as a drawing trajectory (step S10). Here, the resonance frequency of the MEMS mirror 30 is changed due to the change in conditions such as temperature. Therefore, the mirror drive control part 40 tracks the change to perform the drive control of the MEMS mirror 30.

Next, the pixel data generation part 10 determines whether or not there is a phase difference between the vertical scanning line Y and the horizontal scanning line X based on the phase difference φ inputted from the phase comparator 50 (step S20). When a condition such as temperature is close to the normal condition and there is no phase difference φ(φ=0), the drawing starting point is not updated. On the other hand, a condition such as temperature is out of the normal condition and there is the phase difference φ (φ≠0), the drawing starting point is shifted from the normal condition (drawing point 1) in the horizontal direction according to the value of the detected phase difference φ to update the drawing trajectory (step S25).

For example, when the phase of the horizontal scanning line X is behind the horizontal scanning line Y, the drawing starting point is set to P2 that is shifted from P1 for the normal condition by the phase difference in the scanning direction, and the drawing trajectory is T2 that is shifted upwardly from the normal trajectory by the phase difference, as shown in FIG. 4. On the other hand, when the horizontal scanning line X is ahead of the vertical scanning line Y, the drawing starting point is set to P3 which that is shifted from P1 for the normal condition by the phase difference in the direction opposite to the scanning direction, and the drawing trajectory is T3 that is shifted downwardly from the normal trajectory by the phase difference.

Next, the pixel data generation part 10 determines whether or not the frequency ratio R inputted from the phase comparator 50 is the same as the reference value (R=1) (step S30). When a condition such as temperature is close to the normal condition and there is no change in the resonance frequency, and also when the change ratio is the same between the resonance frequency ωx and the resonance frequency ωy, the pixel data generation part 10 determines that the frequency ratio R is the same as the reference value (R=1), so that the drawing trajectory is not updated. On the other hand, when a condition such as temperature is out of the normal condition, and therefore the change ratio is different between the resonance frequency ωx and the resonance frequency ωy, the frequency ratio R varies from the reference value (R≠1). In this case, the drawing trajectory is updated by shifting the drawing trajectory either upwardly or downwardly, according to the inputted frequency ratio R.

For example, when the frequency ratio R changes and therefore is greater than the reference value "1", that is, the resonance frequency ωx is higher than the resonance frequency ωy, the drawing trajectory is shifted upwardly from a drawing direction D1 for the normal condition to a drawing direction D2 to narrow the drawing distance in the vertical direction. On the other hand, when the frequency ratio R changes and therefore is smaller than the reference value "1", that is, the resonance frequency ωx is lower than the resonance frequency ωy, the drawing trajectory is shifted downwardly from the drawing direction D1 for the normal condition to the drawing direction D3 to widen the drawing distance in the vertical direction.

In this way, the drawing trajectory is sifted in response to the changes in the resonance frequency ωx and the resonance frequency ωy. Therefore, it is possible to predict the shifted drawing trajectory by calculating the drawing starting point based on the phase difference φ and calculating the scanning direction based on the frequency ratio R. Therefore, pixel data for one frame that corresponds to the updated and latest drawing trajectory is generated, based on the image data with the fixed pixels inputted to the pixel data generation part 10 (step S40).

Then, the pixel data for one frame, which is generated by the pixel data generation part 10, is outputted to the laser drive part 20 (step S50), and the laser light corresponding to the pixel data is emitted from the laser light source 25 to the MEMS mirror 30. Next, when there is image data for the next frame, the pixel data generation part 10 returns to step S20 and repeats generation of image data, and, on the other hand, when there is no image data for the next frame, ends the control (step S60). Here, in the above descriptions, the step of calculating the drawing starting point and the step of calculating the drawing direction are performed separately, but may be performed as one step because the drawing trajectory including the drawing starting point and the drawing direction is calculated based on the phase difference φ and the frequency ratio R.

Here, as the present embodiment, when drawing is performed with Lissajous scanning, a drawing trajectory in the horizontal direction fluctuates in a sine wave pattern as represented by the equation 2. Therefore, the scanning speed Vx is the maximum at the center of the screen in the horizontal direction and minimum in the end sides, and the brightness of the screen is high in the end sides and low at the center of the screen. Therefore, with the present embodiment, brightness correction is performed on pixel data in proportion to the inverse (1/Vx) of the scanning speed Vx to avoid the difference in brightness between the center and the end sides of the screen in the horizontal direction. Then, a drawing trajectory in the vertical direction also fluctuates in a sine wave pattern, and therefore it is necessary to perform brightness correction as well, because the brightness of the screen is high in the end sides and low at the center of the screen in the vertical direction.

Although the embodiment of the present invention has been described in detail with reference to the drawings, specific configurations are not limited to this, but the present invention may include a design change without departing from the spirit of the present invention. For example, specific number of scanning lines and frequencies are not limited to the embodiment, but may be changed appropriately.

Moreover, an example has been shown where the horizontal scanning line Y for one frame is drawn in each of the outward journey and the return journey for a vertical scanning line, this is by no means limiting. Another configuration is possible where, for example, image drawing is performed only for the period of time for the outward journey, and the laser is turned out for the period of time for the return journey. In this case, the drawing is performed in a single direction for every frame, and therefore the drawing trajectory is not likely to vary between each frame, so that it is possible to further improve the image quality.

Moreover, although an example has been shown where the drawing trajectory is calculated for each frame, it is by no means limiting. Since a resonance frequency does not tend to significantly change between each frame, a drawing trajectory may be calculated for each of a predetermined plurality of frames.

REFERENCE SIGNS LIST 1 image forming apparatus
10 pixel data generation part
20 laser driving part
30 MEMS mirror (scanning part)
40 mirror drive control part 50 phase comparator
55 1/N frequency divider

The invention claimed is:

1. An image forming apparatus configured to display an image, comprising:
a scanning section configured to scan light from a light source in a main scanning direction and a sub-scanning direction orthogonal to the main scanning direction as drawing sine waves at predetermined resonance frequencies, respectively;
a drive control part configured to track a change in the resonance frequencies to perform drive control of the scanning part according to changed resonance frequencies;
a detecting part configured to detect a change in a position of the scanning part in the main scanning direction and a change in a position of the scanning part in the sub-scanning direction;
a phase difference comparator configured to detect a phase difference and a frequency ratio between the main scanning direction and the sub-scanning direction, based on the change in the position of the main scanning direction and the change in the position of the sub-scanning direction, which are detected by the detecting part; and
an image data generation part configured to estimate a scanning trajectory of the scanning part based on the phase difference and the frequency ratio detected by the phase comparator, and generate pixel data corresponding to the scanning trajectory,
wherein the scanning part scans one frame within a period of time for which scanning in the sub-scanning direction is performed in one direction.

2. The image forming apparatus according to claim 1, wherein the image data generation part generates the pixel data corresponding to a drawing trajectory by estimating the drawing trajectory based on the change in the position of the scanning part in the main scanning direction and the change in the position of the scanning part in the sub-scanning direction, which are detected by the detecting part, and also based on the phase difference and the frequency ratio detected by the phase comparator.

3. The image forming apparatus according to claim 1, wherein the image data generation part performs brightness correction in inverse proportion to a density distribution of scanning lines in the sub-scanning direction.

* * * * *